F. L. MICHAELS.
VEHICLE LIGHT CONTROLLING MECHANISM.
APPLICATION FILED NOV. 29, 1915.
1,205,102.
Patented Nov. 14, 1916.
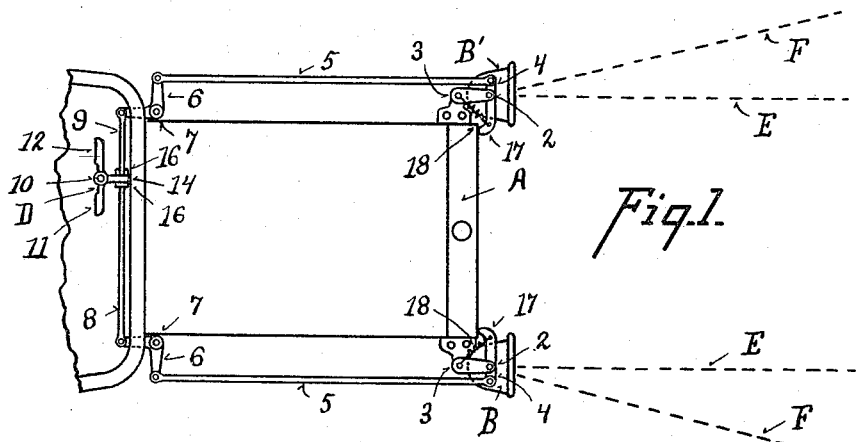
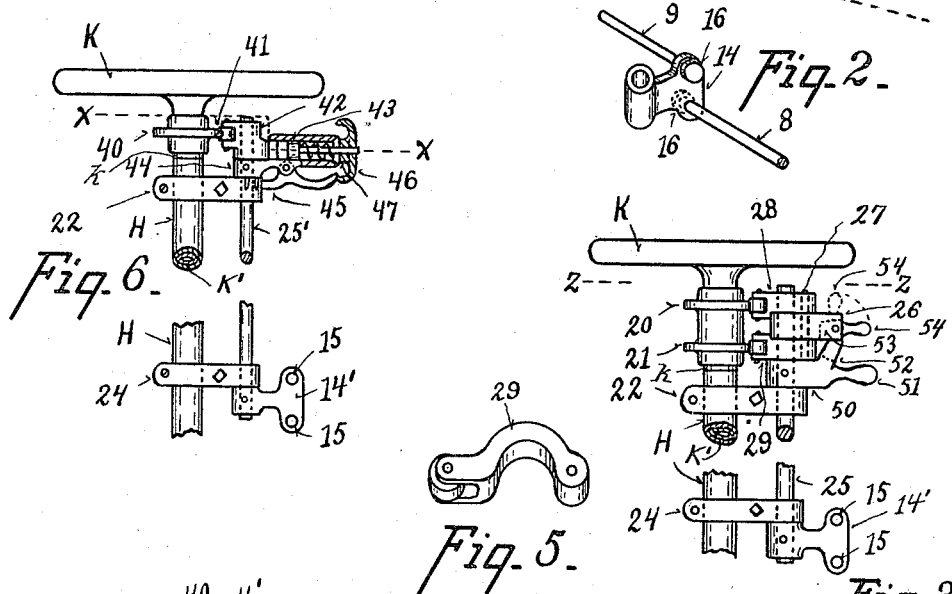
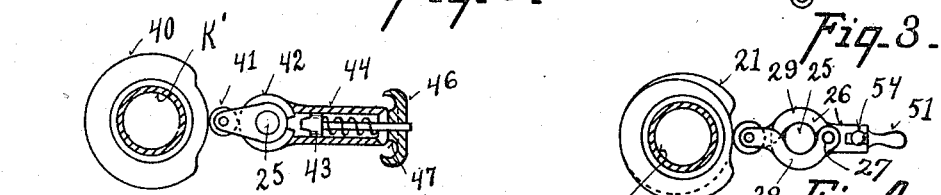

UNITED STATES PATENT OFFICE.

FRANK L. MICHAELS, OF COVINGTON, KENTUCKY.

VEHICLE-LIGHT-CONTROLLING MECHANISM.

1,205,102.  Specification of Letters Patent.  Patented Nov. 14, 1916.

Application filed November 29, 1915. Serial No. 64,113.

*To all whom it may concern:*

Be it known that I, FRANK L. MICHAELS, a citizen of the United States, residing at Covington, in the county of Kenton and State of Kentucky, have invented certain new and useful Improvements in Vehicle-Light-Controlling Mechanism, of which the following is a specification.

My invention relates to mechanism for directing the lights of vehicles upon the roadway to be traveled.

One of its objects is to provide mechanism to outwardly deflect the rays or beam of light from one lamp independently of the other lamp.

Another object is to provide mechanism to outwardly deflect the beam of light from either lamp independently of the other, and provision for the automatic return of said beams to normal position.

Another object is to provide means to automatically control the movements of the beams of light from the respective lamps in unison with the movements of the steering wheel or steering post.

Another object is to provide improved mechanism to automatically and independently direct the movements of the beams of light in unison with the movements of the steering wheel and automatically return the beams of light to normal position.

My invention also comprises certain details of form, combination and arrangement, all of which, will be fully set forth in the description of the accompanying drawings in which:

Figure 1 is a diagram illustrating in top plan the forward portion and lights of an automobile embodying one form of my invention. Fig. 2 is a sectional detail of a portion of the light deflecting mechanism. Fig. 3 is a side elevation of a steering post and one form of light deflecting mechanism operable therefrom. Fig. 4 is an enlarged sectional detail on line z z of Fig. 3. Fig. 5 is a perspective view of one of the cam actuated levers of Figs. 3 and 4 detached. Fig. 6 is a view similar to Fig. 3 illustrating a modification. Fig. 7 is an enlarged sectional detail on line x x of Fig. 6.

The accompanying drawings illustrate the preferred embodiments of my invention. Fig. 1 illustrates a modification in which either lamp may be shifted to direct its light beam outwardly independently of any movement of the other lamp by means of a foot lever. A represents the hood or forward portion of an automobile or other vehicle. B and B' represent the right and left hand lamps respectively which are pivotally or rotatably mounted upon vertical axes 2 of the brackets 3. Crank arms 4 are attached to the lamps and project outwardly or away from the body A. The outer ends of the crank arms 4 are pivotally connected to one end of the respective links 5, and the opposite ends of said links are pivotally connected respectively to one end of the bell crank levers 6, which are pivotally mounted at 7 to the body A. Pull rods 8 and 9 are respectively pivotally connected to the opposite ends of the respective bell cranks 6. A foot lever D is pivoted upon the center 10 to the body A and has two foot pedals 11 and 12 to shift it in opposite directions and an arm 14 to swing transversely to the movement of the pedals. Each of the pull rods passes through a separate hole 15 in the arm 14 and has a head 16 which heads normally rest against opposite faces of the arm 14. Some means is employed to normally hold the lamps with their beams of lights indicated by the dotted lines E directed straight ahead of and in line with the body A, and with the lever D in intermediate or neutral position. For this purpose I have illustrated arms 17 projecting from the lamps inwardly with their free ends in contact with the forward end of the hood or body A. Springs 18 connecting the arms 17 to the brackets 3 serve to normally hold the arms 17 in contact with the body A and the light beams directed along the lines E.

In rounding a curve in the road or for other purposes it is desirable to deflect the beam of light from one lamp from its normal direction along the line E outwardly so as to be projected along the line indicated by the dotted line F, while the light beam of the opposite lamp remains directed along its line E. Operation of the lever D by pushing on its right hand pedal 11 causes the arm 14 to move to the left and pull on the head 16 of rod 8, thereby through the right hand bell crank 6, link 5, and crank arm 4, causing the lamp B to turn on its axis so as to direct its light beam along the line F. This movement of lever D by pressing on the pedal 11 permits the rod 9 to slide endwise in its hole 15 in the lever 14, and there is no movement of lamp B' the light beam of which continues to shine along its line E. As soon as pressure is released on the pedal 11, the spring 18 draws the arm 17 back into contact with the body A carrying the lamp B with lever 17 back to normal position with its light beam along its line E, and the lever D returns to neutral position. In like manner pressure on the pedal 12 of lever D shifts the lamp B' so that its light beam shines along the line F while the light beam of lamp B is not affected and continues to shine along its line E.

Another feature of my invention comprises employing in place of the foot treadle D means to automatically control the movement of the lamps in unison with the movements of the steering wheel, and means to permit the lamps to be controlled manually or automatically as desired. In Figs. 3, 4 and 5 I have illustrated mechanism for this purpose adapted to be used in connection with any ordinary type of steering post and wheel, and in which H represents the steering post rigidly mounted on the automobile body, and K the steering wheel. The steering wheel has a hub $k$ and a steering stem K' journaled in the stationary post H. The cams 20 and 21 are mounted upon the hub $k$ of the steering wheel at the upper end of the steering post. Brackets 22 and 24 are clamped rigidly upon the steering post, and a shaft 25 is journaled in said brackets. A hub 26 is loosely mounted upon the shaft 25 opposite the cams 20 and 21. A pin 27 serves to pivotally connect two levers 28 and 29 to the hub 26.

A hub 50 is rigidly mounted upon the shaft 25 and is provided with a handle 51 by means of which the shaft 25 may be manually rotated if desired. The hub 50 has a slotted projection 52 and the hub 26 has a pivotally mounted handle 54 with a clutch member 53 to enter the slot of the projection 52 to lock the hubs 26 and 50 together when the handle 54 is brought into line above the projection 52 and adjusted to a vertical position. In the horizontal position of handle 54 the hubs 26 and 50 are disconnected, the levers 28 and 29 are idle and the lamps may be controlled by the handle 51. The levers 28 and 29 partially encircle the shaft 25 on opposite sides and their free ends are provided with rollers 30 and 31, to respectively engage the cams 20 and 21. The lower end of the shaft 25 has rigidly attached thereto an arm 14' which operates in the same manner and serves the same purpose as the arm 14 of Fig. 1. The lamps are controlled by arm 14' as illustrated in Fig. 1.

When the wheel K is turned in the right hand direction Fig. 4 the high portion of cam 20 will engage the lever 28 and by forcing the pin 27 to partially rotate with the shaft 25 will swing the arm 14' and move the lamp B' out of its normal position. Any movement of the wheel K to the right will cause the high portion of cam 21 to force the lever 29 away from the shaft 25 without tending to rotate shaft 25. Movement of wheel K to the left will cause the lever 28 to act as an idler and opposite the high point of cam 21 will tend to rotate the shaft in the opposite direction through lever 29, and shift the lamp B out of its normal position.

In the modification Figs. 6 and 7, which is applicable to certain types of steering mechanism, only one cam 40 is mounted upon the steering wheel hub and this is engaged by a roller 41 carried by a hub 42 loose on the shaft 25' to shift the arm 14'. In this modification I preferably employ a spring actuated latch 43 to engage and lock the loose hub 42 to the hub 44 which is rigid on the shaft 25'. The hub 44 is also provided with a latch lever 45 which engages teeth cut in the bracket 22' to lock the shaft 25' to any adjusted position. When the latch is disengaged from the hub 42, the shaft 25' may be operated by hand to control movement of the lamps and locked if desired by latch lever 45. The latch 43 has a head 46 which is provided with a key or stop 47 which when the head 46 is given a partial turn fails to register with its key hole in the handle of hub 44 and holds the latch 43 in released position. When the latch 43 and head 46 are in their engaged position the head 46 enters over the outer end of latch lever 45 and holds latch lever 45 in the unlatched position. When the two hubs 42 and 44 are latched together and latch 45 released the engagement of the high portion of cam 40 serves to partially rotate shaft 25' in opposite directions automatically in unison with the movements of the steering wheel to shift the position of one or other of the lamps.

The mechanism herein illustrated is capable of considerable modification without departing from the principle of my invention.

Having described my invention what I claim is:

1. In a light controlling mechanism a plurality of illuminating members normally held in a predetermined position, and mechanism selectively operable to deflect the light beam of either of said illuminating members out of its normal position without altering the direction of the light beam from the other illuminating member, comprising a rock-shaft to shift said lights, a hand lever within reach of the operator at the steering wheel, mounted rigidly on said rock-shaft, a lever loosely journaled on said rock-shaft and adapted to be clutched to said hand lever, and a cam carried with the steering wheel to rock said rock-shaft in unison with the movements of the steering wheel through said loosely journaled lever when clutched to said hand lever, and by hand through said hand lever when released from said loosely journaled lever.

2. In combination with a vehicle, a plurality of illuminating members normally held in a predetermined position relative to the vehicle, and mechanism connected to said respective illuminating members and in position to be manually or automatically operated by the operator at the steering wheel, comprising a pivotally supported member having a position of rest and movable to the right and to the left thereof, and oppositely arranged pull rods each engaged by said pivotally supported member in moving to one side of its position of rest, to independently deflect said respective illuminating members from their normal position.

3. In combination with a vehicle having a steering member, a plurality of illuminating members normally held in a predetermined position relative to the vehicle, and means operatively connected with the steering member of said vehicle to automatically selectively deflect the light beam of one of said illuminating members out of its normal position without altering the direction of the light beam from the other illuminating member, comprising a rock-shaft journaled in brackets carried by the steering post, a hand lever rigidly mounted upon said rock-shaft near the steering wheel to permit said lights to be manually controlled, and means selectively automatically operable in unison with the movements of the steering wheel to rock said rock-shaft to actuate the lights.

4. In combination with a vehicle a plurality of illuminating members pivotally mounted and normally yieldingly held in a predetermined position relative to the vehicle, and means selectively operable by hand or through the movements of a cam actuated by the steering wheel to deflect the light beam of either of said illuminating members out of its normal position without altering the direction of the light beam from the other illuminating member.

5. In combination with a vehicle having a steering member, a plurality of illuminating members normally held in a predetermined position relative to the vehicle, a cam automatically actuated in unison with the movements of said steering member, and mechanism actuated by the movements of said cam to automatically selectively deflect the light beam of either one of said illuminating members out of its normal position without altering the direction of the light beam from the other illuminating member.

In testimony whereof I have affixed my signature in the presence of two witnesses.

FRANK L. MICHAELS.

Witnesses:
C. W. MILES,
W. THORNTON BOGERT.

Copies of this patent may be obtained for five cents each, by addressing the "Commissioner of Patents, Washington, D. C."